July 11, 1961
P. T. FARNSWORTH
2,992,346
LIGHT TRANSLATING DEVICE
Original Filed May 7, 1952
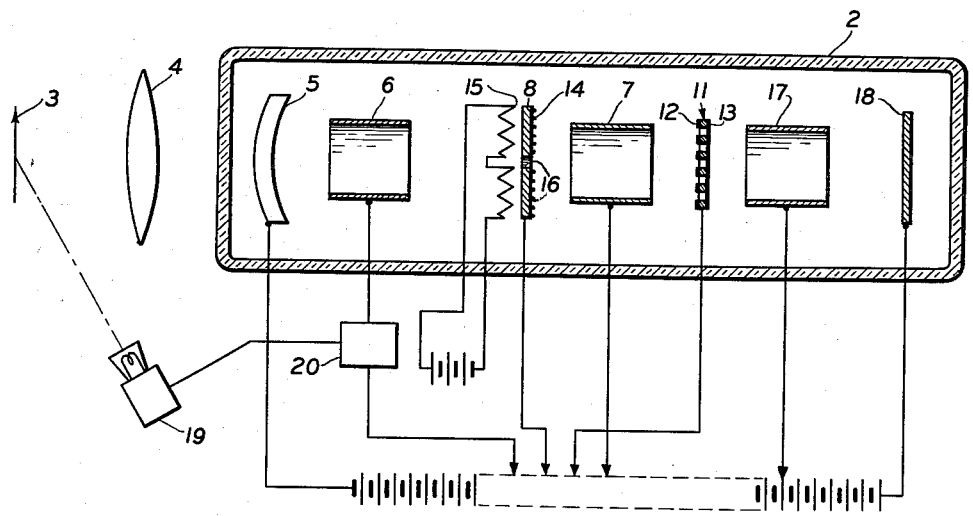
INVENTOR.
PHILO T. FARNSWORTH
BY
Lockwood, Galt, Woodard, & Smith
ATTORNEYS

United States Patent Office 2,992,346
Patented July 11, 1961

2,992,346
LIGHT TRANSLATING DEVICE
Philo T. Farnsworth, Fort Wayne, Ind., assignor to International Telephone and Telegraph Corporation
Continuation of abandoned application Ser. No. 286,583, May 7, 1952. This application Mar. 3, 1954, Ser. No. 413,747
4 Claims. (Cl. 313—67)

This is a continuation application for co-pending Farnsworth application Serial No. 286,583, filed May 7, 1952, and now abandoned.

This invention relates generally to electronic light translating devices and more particularly to such devices for translating a radiation image (infra-red or visible) of a given intensity into a light image of greater intensity, or for producing from a light image of a given duration a light image of another duration.

Devices are known which convert an infra-red light image into a corresponding visible light image. In many instances the intensity of the resultant visible light image is less than desired. Likewise when the infra-red light image is of short duration, as when stroboscopic flashing is employed, the resultant visible light image is often too brief for adequate viewing.

An object of the present invention is the provision of an improved electronic device for translating a light image of a given intensity into a light image of greater intensity.

Another object of the present invention is the provision of an electronic device adapted to translate a light image of brief duration into a light image of greater duration.

A further object of the present invention is the provision of an electronic device for translating an infra-red light image into a corresponding visible light image which produces an intensified visible light image and is adapted to store and produce from brief infra-red light images, visible light images of greater duration.

In carrying out my invention, a photocathode is arranged to receive the impinging light image and to release a corresponding electron image. This electron image is focused on a separate storage electrode to produce thereon a corresponding electrostatic charge pattern or image. The storage electrode is provided with a multiplicity of small openings and for this purpose may be in the form of a fine mesh screen. A spray of electrons (from a flood cathode) is directed through the screen openings and the number of electrons passing through the openings is controlled by the electrostatic charge on the portion of the screen surrounding each opening. Thus there is produced an extended electron image of an intensity which varies in its elemental areas in accordance with the corresponding charges on the screen. Under proper operating conditions, the extended electron image is of greater intensity than the original electron image emitted by the photocathode. This intensified electron image is then directed onto a fluorescent screen to produce a correspondingly intensified light image. It will be noted that even if the duration of the incoming light image is short, the intensified light image may be of greater duration due to the storage of the electron image or the storage electrode.

It is to be noted that in accordance with the present invention the photocathode and the storage electrode are separate electrodes and are spaced from each other instead of being combined into a single electrode. This provides numerous advantages. Broadly speaking, this enables "optimizing" the characteristics of each of the electrodes to serve its respective function best. Thus, for example, the surface of the photocathode is continuous so that none of its effective area is lost in insulation between separate photocathode electrodes. Migratory caesium atoms of the photocathode which would affect the leakage of the storage screen in an unpredictable and hardly controllable manner cannot affect this leakage when the photocathode and storage screen are separate. If a thermionic flood cathode were employed to provide a large image current, various problems would be introduced into the photocathode, such as cathode fatigue, etc., if the photocathode and the storage electrode were combined.

Accordingly a further object of the present invention is to provide an improved device for translating a light image into a more intense light image in which the means responsive to the incoming light image for producing an electron image is separated and spaced from a means for storing the electron image in the form of an electrostatic image.

The foregoing and other features and objects of this invention and the manner of attaining them will become apparent and the invention itself will be better understood, by reference to the following description of an embodiment in which the drawing is a schematic representation of an electron discharge light image translating device together with associated apparatus.

Referring now to the drawing, the electron discharge device 1 is provided with an evacuated envelope 2 which contains various electrodes to be described hereinafter. As represented in the drawing, a light image from an object 3 is focused by means of a suitable lens 4 (indicated schematically) onto a photocathode 5, which in response to said light image emits a corresponding electron image. This electron image is directed by suitable means, such as by accelerating electrodes 6 and 7 and focusing electrode 8, onto a storage electrode 11. This electrode 11 consists essentially of a thin plate 12 of insulating material having fine mesh openings, as in a screen. Preferably, the insulating material 12 consists of a coating of dielectric material on the side of a fine wire screen mesh screen 13, the dielectric material facing the photocathode 5. The dielectric coating is provided with openings in registry with the wire mesh screen openings. The fine wire mesh screen 13 may be used for purposes of mechanical support, for erasure of the electrostatic charge on the insulation, or for controlling the degree of electron penetration. The storage electrode 11 may be of the type shown and described in my corresponding U.S. application for "Cathode Ray Tube and System," Serial No. 197,612, now Patent No. 2,754,449, filed November 25, 1950. The electrons from photocathode 5 are preferably given a sufficient velocity by the voltage on the accelerating electrodes so as to produce a secondary emission from the insulation 12 which is greater than unity, thus producing a positive electrostatic charge image on the insulation 12 corresponding to the electron image from photocathode 5. Electrode 8 in addition to its focusing function serves as a flood cathode and for this purpose may be coated with the usual emissive barium-strontium oxides on the side 14 facing the storage electrode 11. Electrode 8 may be energized by any suitable means such as by a heating coil 15. Electrode 8 has an opening 16 in the center which is at the cross-over point of the electron image emitted from the photocathode 5. Electrons from the flood cathode 8 pass through the accelerating electrode 7 and spray the entire surface of the electrode 11. The electrostatic charge on the insulation 12 controls the flow of flood electrons through the screen openings to produce an amplified extended electron image which may be projected onto the fluorescent screen 18. Stated in other words, electrode 11 resembles the grid of an amplifying tube (as more fully described in said U.S. application Serial No. 197,612, now Patent No. 2,754,449), so that the electrons from flood cathode 8 that pass through the electrode 11 produce an amplified electron image on the right side of the electrode 11. This amplified image is accelerated by electrode 17 and directed onto the screen 18 coated with suitable phosphors. The amplified electron image is thereby translated into an amplified light image.

Erasure of the electrostatic charge image may be accomplished by leakage from the insulating material 12 onto screen 13, by varying the potential of the electrons issuing from flood cathode 8 to produce such erasure, or by other means well known in the art.

An advantage of the arrangement just described is that even though the input light image of object 3 is so brief that it cannot be discerned by the human eye, because of the development of the corresponding electrostatic charge image on storage electrode 11, the amplified light image produced on screen 18 will be of longer duration so that in effect the brief input light image is extended in duration as viewed on screen 18. The persistence of the electrostatic charge image on storage electrode 11 is controllable by the particular material used for the dielectric coating 12, the coating thickness, and the coating shape, as well as the potential on screen 13 as will be recognized by one versed in the art.

In accordance with another feature of the present invention, use is made of the above phenomena by providing a stroboscopic light source 19 which flashes light, visible or infra-red, onto the object 3, under the control of the usual stroboscope control means 20. In order that the device 1 will respond only to the reflected stroboscopic light from object 3, control device 20 momentarily renders device 1 inoperative, for example, by removing the accelerating voltage from accelerating electrode 6. Other means for preventing operation of device 1 will readily occur to those versed in the art. It will thus be seen that very short flashes of stroboscopic light will suffice to produce a light image of object 3, which though extremely short in duration will, by means of the device 1, produce a light image (on screen 18) of sufficient duration to be clearly seen or studied.

While the foregoing description has given specific details of an embodiment of my invention, it will be apparent that numerous changes may be made in these details without departing from the spirit thereof. The specific structure of storage electrode 11 can be changed in various ways within the scope of the present invention and still produce the charge image and the amplifying action herein described. Changes in the focusing system are obvious. Furthermore, while I have described a storage screen that is charged positively by the primary electrons of the electron image, the screen may be charged to produce a resulting negative electrostatic image and the device may thus operate in this manner as an amplifier, the theory of operation being similar to that described in my U.S. Patent No. 2,257,942 issued October 7, 1941, for "Image Amplifier."

Accordingly, while I have described above the principles of my invention in connection with specific apparatus, it is to be clearly understood that this description is made only by way of example and not as a limitation to the scope of my invention.

What I claim is:

1. A system for viewing objects comprising a source of radiation flashes which may be trained on a viewed object for obtaining reflected radiation images of said object of short duration, a viewing device comprising a photoelectric cathode responsive to said reflected images for producing corresponding electron images, a storage electrode for storing said electron images for a predetermined period of time, a flood cathode positioned to flood said storage electrode with electrons which are modulated in accordance with the stored images to produce secondary electron images, a luminescent screen responsive to said secondary electron images for reproducing instantaneously all elements of said electron images into corresponding light images, and a signal generator operatively coupled to said viewing device and said source, said signal generator controlling the flashing of said source and the operation of said viewing device in such a manner that said photocathode is effective only during reception of a reflected image.

2. A system for viewing objects comprising a source of radiation flashes which may be trained on a viewed object for obtaining reflected radiation images of said object of short duration, a viewing device comprising a photoelectric cathode responsive to said reflected images for producing corresponding electron images, a storage electrode for storing said electron images for a predetermined period of time, a flood cathode positioned to flood said storage electrode with electrons which are modulated in accordance with the stored images to produce secondary electron images, a luminescent screen responsive to said secondary electron images for reproducing instantaneously all elements of said electron images into corresponding light images, and a signal generator operatively coupled to said viewing device and said source, said signal generator providing a signal which prevents the photoelectric image from impinging said storage electrode, and further controlling the flashing of said source, the flashing of said source and control of said photoelectric image being synchronized such that said storage screen is charge with an image only during the time said cathode is receiving a reflected image.

3. A radiation image reproducing device comprising a photoelectric cathode arranged to receive a radiation image and to produce a first electron beam responsive thereto defining a first electron image, a luminescent display screen spaced from said cathode and responsive to a second electron beam defining a second electron image for reproducing the latter in visible form, an electron image storage screen interposed in alignment between said cathode and said luminescent screen, electron lens elements arranged to focus said first electron beam from said cathode onto said storage screen, said storage screen being sensitive to said first electron beam to provide a charge pattern corresponding to said first electron image, said storage screen being of reticulate form and including a dielectric material, and a flood cathode having an emissive area at least as large as said storage screen and being interposed in alignment between said photo-electric cathode and said storage screen for flooding the latter with a flood beam of electrons, said flood cathode being positioned at the crossover point of said first electron beam from said photo-electric cathode and having a relatively small, centrally located aperture formed therethrough arranged to pass said first electron beam, the electrons from said flood cathode passing through said storage screen and being modulated by the latter to produce said second electron beam and thereby said second image.

4. A radiation image reproducing device comprising a photoelectric cathode arranged to receive a radiation image and to produce a first electron beam responsive thereto defining a first electron image, a luminescent display screen spaced from said cathode and responsive to a second electron beam defining a second electron image for reproducing the latter in visible form, an electron image storage screen interposed in alignment between said cathode and said luminescent screen, electrode lens elements arranged to focus said first electron beam from said cathode onto said storage screen, said storage screen being sensitive to said first electron beam to provide a charge pattern corresponding to said first electron image, said storage screen being of reticulate form and including a dielectric material, and an electrode interposed in alignment between said photo-electric cathode and said storage screen at the cross-over point of said first electron beam and having a relatively small, centrally located aperture formed therethrough for passing said first electron beam, said last-named electrode having electron emissive material deposited on an area thereof at least as large as said storage screen and facing the same, and heating means disposed on the side of said last-named electrode remote from said storage screen for energizing said emission material thereby to flood said storage screen with a flood beam of electrons, said flood beam of electrons from said last-named electrode passing through said storage screen and being modulated by the latter to produce said second electron beam and thereby said second image.

References Cited in the file of this patent

UNITED STATES PATENTS

| | | |
|---|---|---|
| 2,254,617 | McGee | Sept. 2, 1941 |
| 2,322,361 | Iams | June 22, 1943 |
| 2,462,569 | Sziklai | Feb. 22, 1949 |
| 2,532,339 | Schlesinger | Dec. 5, 1950 |
| 2,611,820 | Somers | Sept. 23, 1952 |
| 2,639,425 | Russell et al. | May 19, 1953 |
| 2,739,244 | Sheldon | Mar. 20, 1956 |
| 2,765,422 | Henderson | Oct. 2, 1956 |